United States Patent

Heidtman et al.

[15] 3,641,697
[45] Feb. 15, 1972

[54] CARRYING CASE FOR A FISHING ROD AND REEL

[72] Inventors: Albert G. Heidtman, 565 Colonial Way; Albert H. Teitjen, 515 Colonial Way, both of Reno, Nev. 89502

[22] Filed: Aug. 27, 1969

[21] Appl. No.: 853,282

[52] U.S. Cl. .............................. 43/26, 43/54.5 R, 206/16 R
[51] Int. Cl. ....................................................... A01k 97/08
[58] Field of Search ............... 43/44.89, 44.92, 44.97, 43.1, 43/44.83, 44.84; 206/16 R

[56] References Cited

UNITED STATES PATENTS

| 2,706,036 | 4/1955 | Neal | 206/16 R |
|---|---|---|---|
| 2,650,449 | 9/1953 | Suring | 43/26 |
| 2,850,220 | 9/1958 | Ehrler et al. | 43/54.5 UX |
| 2,902,790 | 9/1959 | Harvey | 43/26 |
| 3,310,905 | 3/1967 | Davis et al. | 43/57.5 |

FOREIGN PATENTS OR APPLICATIONS

| 459,902 | 9/1949 | Canada | 43/26 |
|---|---|---|---|
| 1,419,803 | 10/1965 | France | 43/26 |

Primary Examiner—Samuel Koren
Assistant Examiner—Daniel J. Leach
Attorney—Roylance, Abrams, Berdo & Kaul

[57] ABSTRACT

A rigid plastic carrying case is provided with two elongated sections interconnected by hinges and thus being foldable into a closed container. One of the sections is provided with an outwardly directed depression along the side thereof to accommodate a fishing reel. This enables the carrying case to receive and retain a fishing rod and an attached reel, without the need for detaching the reel from the rod when inserting the same into the case.

4 Claims, 6 Drawing Figures

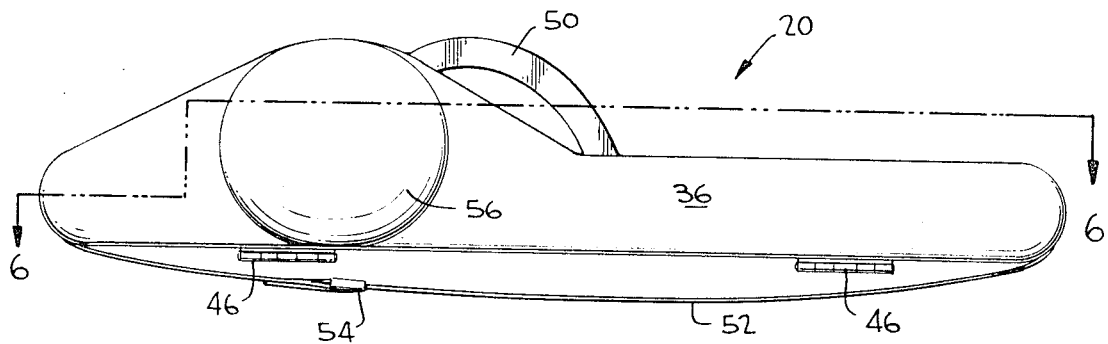
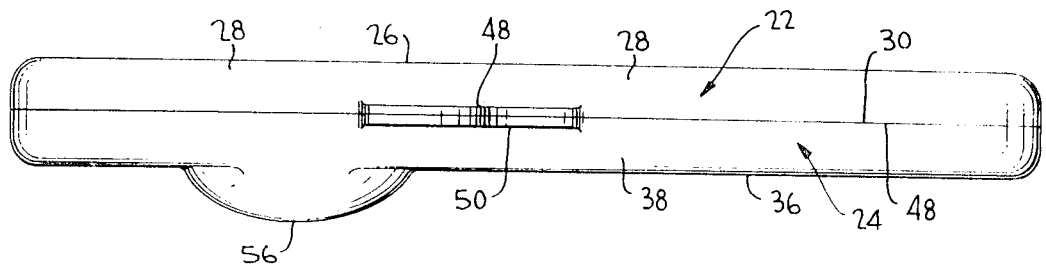
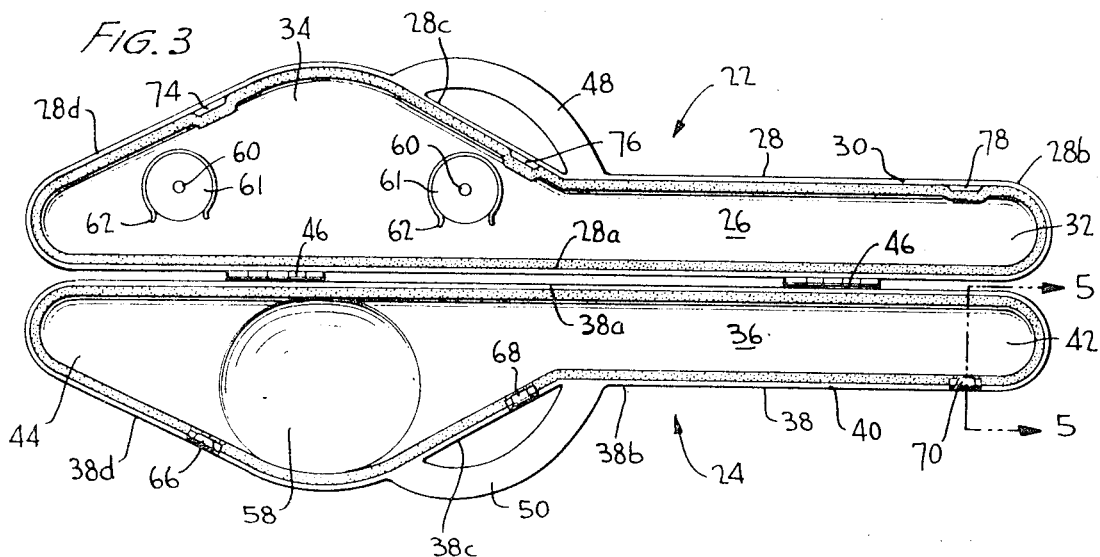

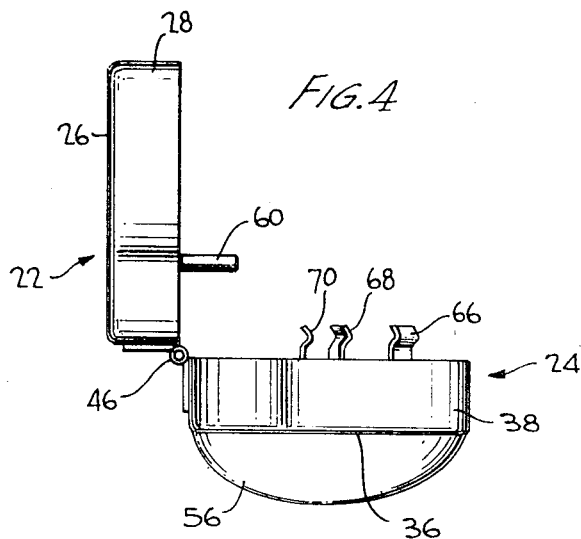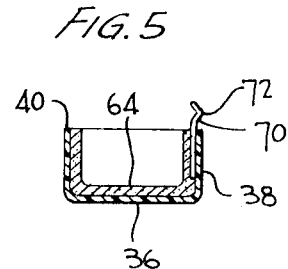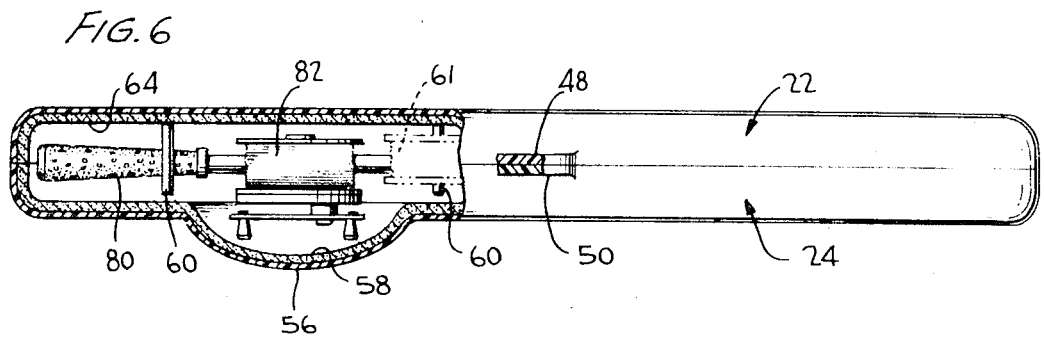

CARRYING CASE FOR A FISHING ROD AND REEL

This invention relates to carrying containers and more particularly it relates to a container which is designed to carry a fishing rod and reel combination, without the need for detaching the reel from the rod at the time that the same is inserted into the case.

There have in the past been various types of known containers for fishing rods, but such containers were capable of only carrying the rod itself and in the use of such containers, it was necessary for the fisherman to remove the reel from the rod and to carry the reel in a tackle box. Naturally, an arrangement of this type required an extra amount of manual manipulation and it thus seem beneficial to provide an improved type of carrying case wherein the rod and reel can be transported in an assembled condition.

There have admittedly been proposals in the prior art to provide a carrying case for a combined fishing rod and reel, but such carrying cases have not proved to be particularly versatile in use. For example, one such carrying case utilized a projecting portion at the bottom thereof to house the reel, and this projecting portion made it impossible for the carrying case to be laid flatly on its bottom.

In contrast thereto, it is an object of the present invention to provide an improved carrying case for an assembled fishing rod and reel, which carrying case is capable of resting on its flat bottom or on a flat side thereof and can thus be easily transported.

Another object of the present invention is to provide an improved form of carrying case for a fishing rod and reel wherein the carrying case, the handles and the latching means therefor are all integral, thus enabling the case to be easily manufactured by existing mass production techniques.

Another object of the present invention is to provide a carrying case which is capable of carrying an assembled fishing rod and reel, of retaining the respective parts in their respective positions within the casing even during transporting and handling, and which cushions the parts within the case against any shocks.

Another object of the present invention is to provide a strong, durable carrying case for a fishing rod and reel which can be easily handled and transported and which is capable of an extended life.

Other objects, advantages and salient features of the present invention will become apparent from the following detailed description, which, taken in conjunction with the annexed drawings, discloses a preferred embodiment thereof.

Referring now to the drawings, which form a part of this original disclosure:

FIG. 1 is a side elevational view of a carrying case in accordance with the principles of the present invention;

FIG 2 is a top plan view of the carrying case;

FIG. 3 is a plan view of the carrying case in open condition;

FIG. 4 is an end view of the case in open condition;

FIG. 5 is a fragmentary sectional view taken along the line 5—5 of FIG. 3; and

FIG. 6 is a top plan view, partly in section, as seen along the line 6—6 of FIG. 1.

The foregoing objects are attained generally by providing a carrying case with a body formed of two elongated sections which are hinged to one another. Each of the sections is fabricated of a rigid plastic material and each section is lined with a foam plastic material which acts as a cushioning material to protect the rod and reel against any shock forces which might be encountered in handling or transport. The sections each include an outer wall, one of which includes a portion which is bulged outwardly to form a depression communicating with the interior of the casing. This depression receives and accommodates the projecting portion of the fishing reel, as it is attached to the rod. The outer wall opposite that carrying the depression includes pins which project toward the depression and which serve to support additional reel spools. Additionally, each casing section is provided with an integral handle and when the casing sections are closed, the two handles are juxtaposed to one another to provide a carrying handle. Also, integral latch means are formed on the casing, such latch means including projections formed on the flange on one casing section which frictionally engage with the flange on the opposite casing section.

The invention will be better understood by reference to the drawings wherein the carrying case itself is generally designated 20. Such carrying case includes a casing body formed of two elongated sections which are generally designated 22 and 24, respectively. The section 22 includes a main wall portion 26 with an upturned peripheral flange portion 28 projecting laterally from the main wall portion completely therearound. The peripheral flange 28 is provided with a substantially continuous flat edge 30 therealong, as can best be seen from FIG. 3. The section 22 is provided with an elongated forward portion 32 and an enlarged rear portion 34. Specifically, insofar as the flange 28 is concerned, such flange includes an elongated linear portion 28a along one edge, a parallel portion 28b spaced therefrom and extending along the forward section 32, an upwardly extending portion 28c and a downwardly extending portion 28d the latter two portions being disposed along the rear end 34.

The section 24 is generally analogous to the section 22 and hence includes a main wall portion 36 surrounded by an upstanding peripheral flange 38 terminating in a substantially continuous flat edge 40. The section 24 includes a forward portion 42 and rear portion 44 which are configured substantially the same as the portions 32 and 34 and the edge or flange sections 38a, 38b, 38c and 38d are similar to those described in connection with the section 22.

As a result, as can be seen in FIG. 3, the two casing halves provide compatible sections which are generally like mirror images of each other. Hinge means 46 can be connected to the flanges 26 and 28, in the manner shown in FIG. 4 with such hinge means being provided along the flange portions 28a and 38a, respectively, as shown in FIG. 3. In this manner, the two casing sections 22 and 24 are movably interconnected with one another and can be swung completely open as shown in FIG. 3, partially open as shown in FIG. 4 or can be closed, as shown in FIGS. 1, 2 and 6.

In order to facilitate transportation of the carrying case 20, handle means are formed along each of the casing sections 22 and 24. The handle means consists of handle portions 48, 50 integrally connected respectively with the flange portion 28c on the casing section 22 and the flange portion 38c on the casing section 24. Each of the handle sections 48, 50 is arched to thus provide an opening through which the user's fingers can extend, and when the casing halves are closed in the manner shown in FIG. 2, the entire casing and its contents can be readily grasped by and transported by the handles 48, 50. As an auxiliary means of transporting the carrying case 20, a strap 52 with an adjustment buckle 54 can be provided along the bottom of the casing, as shown in FIG. 1, with the ends of the strap 52 being connected to the casing at opposite ends thereof. The provision of such a strap would enable the carrying case to be slung over the user's shoulder and thus body carried.

In order to accommodate the reel, one of the casing sections is provided with an outwardly bulged portion. Specifically, the section 24 is provided with such an outward bulge 56 which thus creates a corresponding depression 58 within the casing. This outwardly bulged portion or depression is of generally rounded configuration, as shown, and is formed integrally with the remainder of the main wall 36.

A pair of elongated spaced pins 60 are provided on the interior of the main wall 32 of the other casing section 22, as shown in FIG. 3. The length of the pins 60 is such that the ends thereof project beyond the flange 28 on the casing section 22, as shown in FIG. 4. The pins 60 are spaced apart from one another by a slightly greater distance than the diameter of the rounded portion 56 and serve to support spare spools 61 of fishing line which can be inserted into the fishing reel. Clips 62 surround each spool 61 to keep the fishing line thereon from unwinding.

The entire casing as formed by the sections 22 and 24 is fabricated of some rigid material, such as rigid plastic and one suitable material is a rigid polystyrene. The entire interior of the casing 20 is lined with a foam-cushioning material 64 and, as shown in FIG. 5, such cushioning material covers the main wall portion of each casing section as well as the flange portions thereof. The cushioning is preferably of some foamed plastic material which is generally resilient and which thus enables the contents of the carrying case to be cushioned against shock which might otherwise be encountered during handling or transport.

Finally, releasable means must be provided for holding the casing sections 22, 24 in closed position and such releasable means includes a series of upstanding projections 66, 68 and 70 which are formed along the flange 38 and which project above the flat edge 40 thereof. As illustrated in FIG. 5, the projection 70 includes a lower portion which is rigidly attached to the interior of the flange 38, along the portion 38b thereof and it also includes an upstanding portion having a ridge 72 therealong. Each of the other projections 66 and 68 are likewise provided with such an outward ridge which is intended to engage frictionally against the interior of the mating portion on the flange 28 when the casing sections 22 and 24 are closed. The cushioning material 64 is spaced away from the flange 28 at appropriate places where the projections will contact the same thus leaving pockets 74, 76 and 78 into which the projections 66, 68 and 70 will respectively engage.

As shown in FIG. 6, a fishing rod 80 and a fishing reel 82 connected thereto can be readily positioned within the casing. The outer extremities of the reel fit within the depression 58 formed by the outwardly bulged portion 56. In this manner, the rod and reel can be positioned within the casing and will be restrained from movement therein even while such carrying case is being transported or otherwise handled. When the casing halves are swung open, which can be accomplished simply by separating the handle portions 48 and 50 and pulling the same outwardly, the fishing rod 80 and its attached reel 82 can be readily removed. If desired, the casing can also incorporate means for accommodating the individual sections of the fishing rod 80, should it become desirable to separate such sections and thereby diminish the length of the casing 20.

After reading the foregoing detailed description, it should be apparent that the objects set forth at the outset hereof have been successfully achieved by the present invention. Accordingly,

What is claimed is:

1. A carrying case for a fishing rod and reel comprising a casing body formed of two elongated sections movably interconnected with one another;

each of said sections being fabricated of a rigid material and consisting of a main wall portion and a peripheral flange portion projecting substantially perpendicular to the main wall portion and being substantially flat in a plane perpendicular to said main wall portion, said flange portion having a substantially linear side, said sections being interconnected between the juxtaposition of said linear side with the linear side of the other section, whereby, when said sections are closed, said interconnecting flange portions form a substantially flat surface;

said peripheral flange portions each having a substantially continuous flat edge, said edge on one section abutting against the edge on the other section when said carrying case is closed;

each of said sections having a handle portion formed integrally with the peripheral flange portion on the side opposite its interconnection with the other section, said handle portions being juxtaposed to one another when said casing is closed to provide a carrying handle therefor, said handle portion being positioned in a portion of said casing body which is accessible when said flat surface is resting on a supporting surface;

one of said main wall portions having a depression formed therein, such depression being directed opposite from the peripheral flange thereon;

said depression providing a receiving pocket for a reel so that a fishing rod and attached reel can be stored within said carrying case without the need of removing said reel from said rod; and said carrying case, including pins mounted on the section opposite that section having said depression, said pins being spaced apart and being capable of supporting spare spools for said reel.

2. A carrying case as defined in claim 3 further including releasable means for holding said casing sections in closed position, said releasable means including a portion on one section which frictionally engages a portion on the other section, said portion on one section includes at least one projection attached to the peripheral flange thereon, and wherein a portion of the other section is the interior surface of the peripheral flange thereon.

3. A carrying case as defined in claim 1 wherein said rigid material is a rigid plastic.

4. A carrying case as defined in claim 3 further including a foam plastic material within said casing body to provide cushioning for said rod and reel.

* * * * *